No. 890,666. PATENTED JUNE 16, 1908.
H. LEMP & H. S. BALDWIN.
BRAKE MECHANISM FOR SELF PROPELLED VEHICLES.
APPLICATION FILED AUG. 7, 1905.
3 SHEETS—SHEET 1.
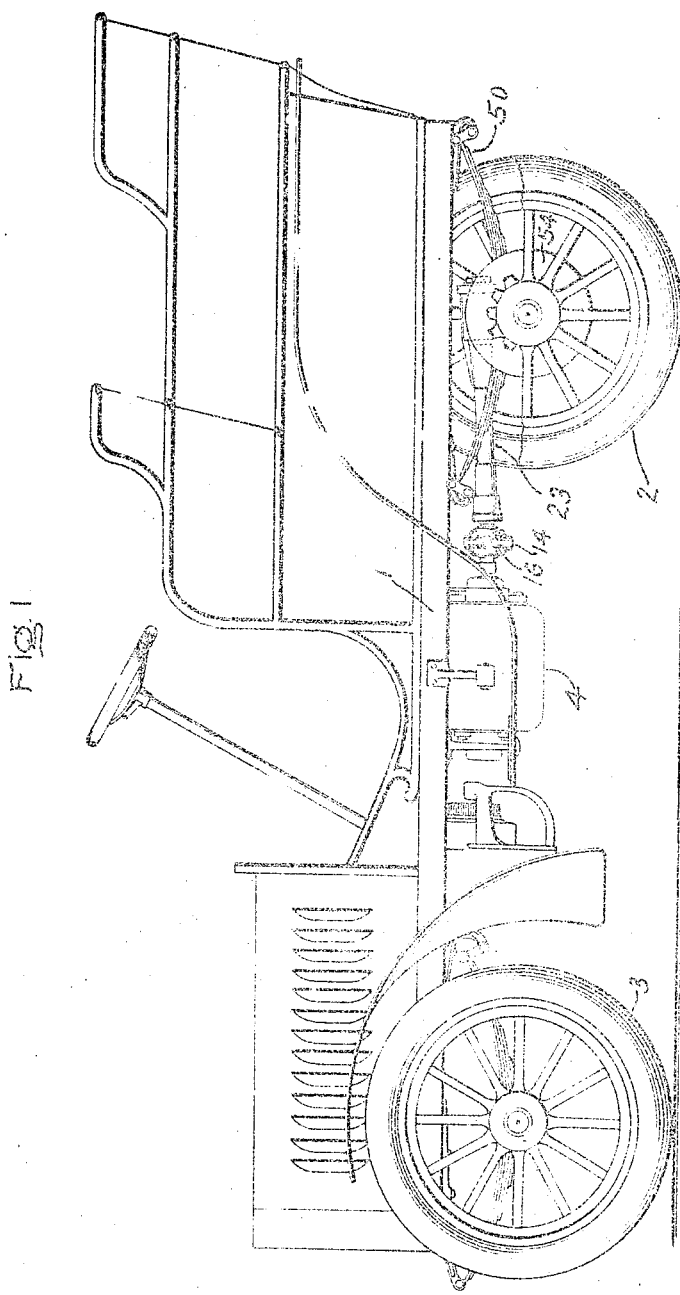
Witnesses:
Inventors
Hermann Lemp,
Henry S. Baldwin,
By
Att'y.

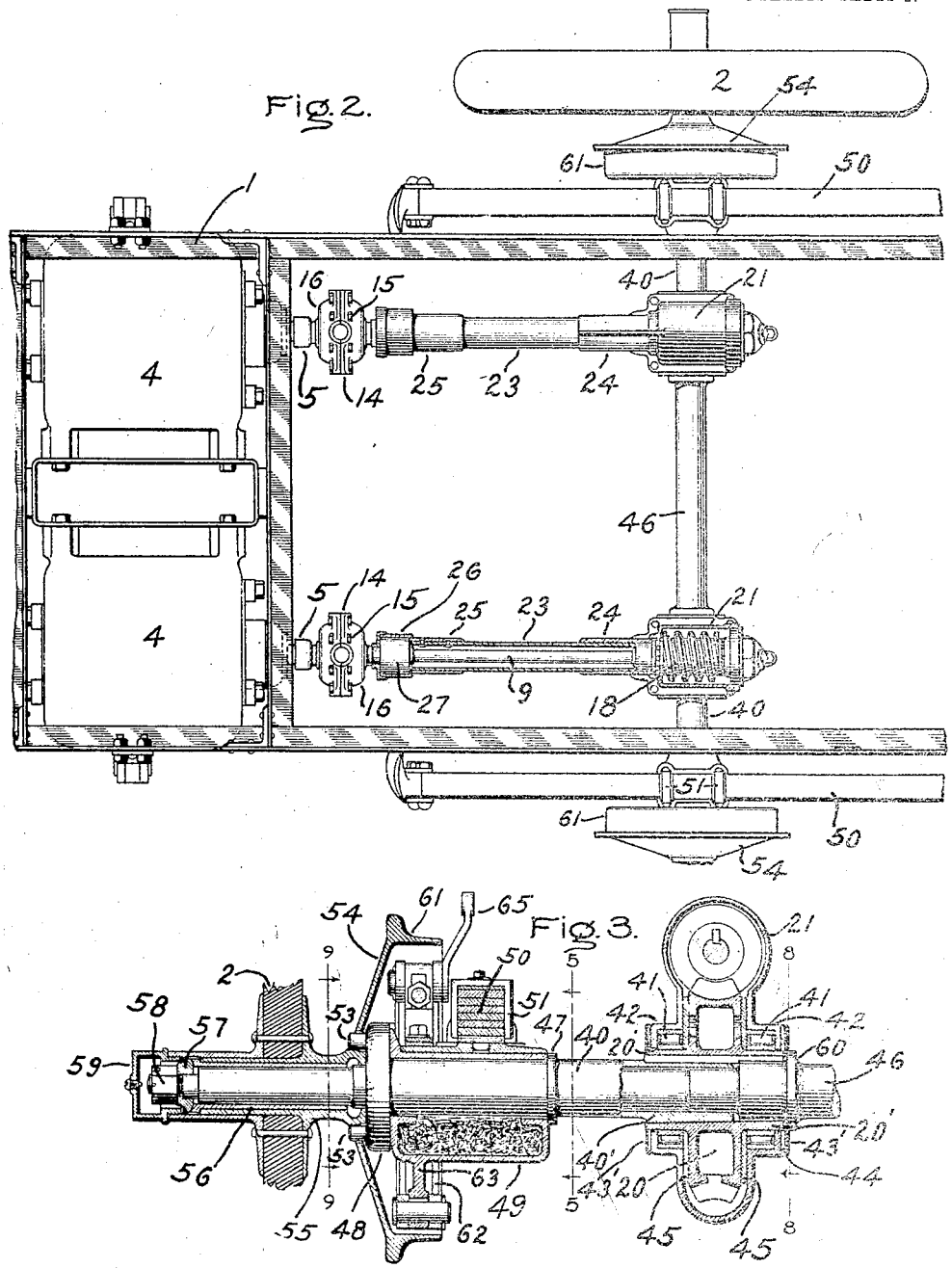

No. 890,666. PATENTED JUNE 16, 1908.
H. LEMP & H. S. BALDWIN.
BRAKE MECHANISM FOR SELF PROPELLED VEHICLES.
APPLICATION FILED AUG. 7, 1905.
3 SHEETS—SHEET 3.
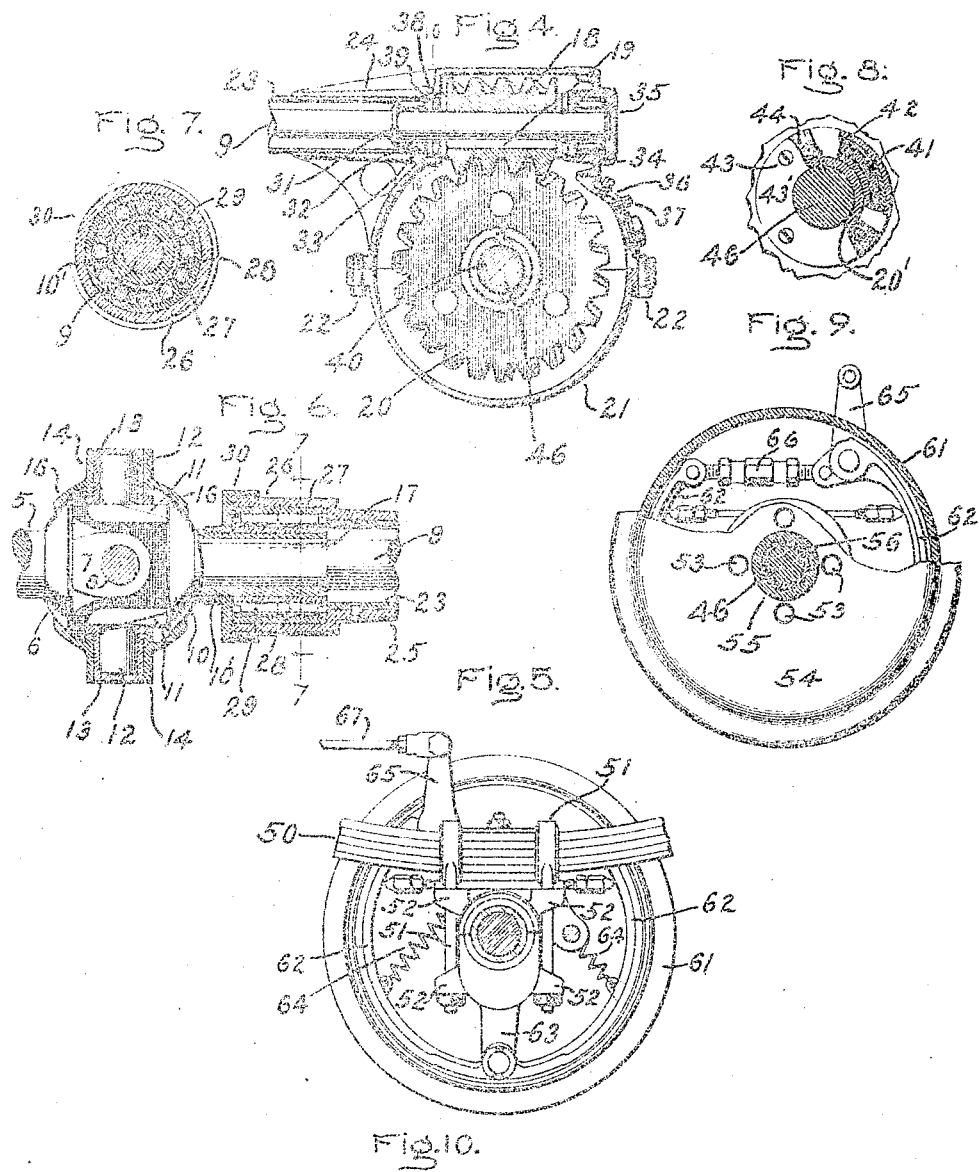
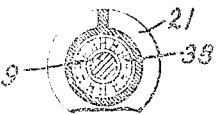
Witnesses:
Inventors,
Hermann Lemp,
Henry S. Baldwin,
By Albert G. Davis
Att'y

UNITED STATES PATENT OFFICE.

HERMANN LEMP AND HENRY S. BALDWIN, OF LYNN, MASSACHUSETTS, ASSIGNORS TO GENERAL ELECTRIC COMPANY, A CORPORATION OF NEW YORK.

BRAKE MECHANISM FOR SELF-PROPELLED VEHICLES.

No. 890,666.

Specification of Letters Patent.

Patented June 16, 1908.

Application filed August 7, 1905. Serial No. 272,990.

*To all whom it may concern:*

Be it known that we, HERMANN LEMP and HENRY S. BALDWIN, citizens of the United States, and residents of Lynn, in the county of Essex, State of Massachusetts, have invented certain new and useful Improvements in Brake Mechanism for Self-Propelled Vehicles, of which the following is a specification.
The present invention relates to brake mechanism for motor vehicles and the object of the invention is to so improve the construction of the mechanism as to provide a simple, reliable and efficient vehicle brake, the parts of which are readily assembled and taken apart, and to secure more satisfactory operation of the same.

In the accompanying drawings, which illustrate one embodiment of our invention, Figure 1 is a side elevation of a motor car; Fig. 2 is a plan view of a portion of a chassis adapted to be used in said car; Fig. 3 is a sectional elevation of a portion of the driving axle; Fig. 4 is a transverse section of said shaft through the worm wheel and worm; Fig. 5 is a section of said shaft on the line 5 5, Fig. 3; Fig. 6 is a sectional elevation of the universal joint between the motor shaft and the worm shaft; Fig. 7 is a cross section of the same on the line 7 7, Fig. 6; Fig. 8 is a cross section of the driving shaft on the line 8 8, Fig. 3; Fig. 9 is a section of the same on the line 9 9, Fig. 3; and Fig. 10 is a cross section of the worm shaft on the line 10 10, Fig. 4.
The car illustrated is of the tonneau type, but the invention is applicable to any kind of a motor car. The various parts are mounted on a frame 1, which is spring-supported on driving wheels 2 and steering wheels 3 in the customary manner.

Mounted below the car-body at any convenient point, but preferably under the foot board, are two motors 4. In the present instance electric motors are shown; but any other kind of a motor can be employed without departing from our invention.

Power for the motors is taken from any suitable source of supply located in the car, and the motors are provided with a suitable controller.

Each motor drives a separate driving wheel, said wheels being mounted on independent axles. It will be necessary, therefore, to describe the driving mechanism of only one of said motors, since their construction and operation are identical.

The end of the armature shaft 5 is provided with a spherical segment 6, Fig. 6, provided with diametrically-opposite lugs 7 from which project trunnions 8 whose common axis is at right angles to the armature shaft. The worm shaft 9 has on its front end a spherical segment 10, similar to the segment 6 and like that provided with lugs 11 having outwardly extending trunnions 12, whose common axis is in the same transverse plane as that of the trunnions 8, but at right angles thereto. Each of these four trunnions has a rotating fit in a cap bushing 13, and the four bushings are clamped rigidly between the two rings 14, which are held together by the bolts 15, Fig. 2. The rings have flanges 16 whose inner surfaces are spherical in order to coöperate with the segments 6 and 10. The rings prevent any lateral displacement of the armature shaft and worm shaft, but the trunnions permit these shafts to vary considerably from perfect alinement. In other words, the structure constitutes a good universal joint between the two shafts.

The segment 10 is mounted on the worm shaft by means of a sleeve 10' integral with said segment and fitting said shaft snugly, being rigidly secured thereto by a key 17. The rear end of the worm shaft has a worm 18 slidably connected with it by a spline 19 and meshing with a worm wheel 20, Figs. 2 and 4. The worm and worm wheel are inclosed in a casing 21, made in two parts secured together by screws 22.

The worm shaft is housed in a tube 23, whose rear end is secured in a tubular extension 24 on the casing 21 and whose front end carries a roller bearing for the shaft. This bearing is preferably constructed as shown best in Fig. 6. A sleeve 25 is riveted to the tube 23 and has an enlarged portion 26 in which is a hardened steel bushing 27. On the sleeve 10' of the segment 10 is placed a hardened steel jacket 28, and between this and the bushing 27 are a series of cylindrical steel rollers 29, suitably mounted in a cage, as usual. A cap 30 is forced upon the sleeve 10' and covers the end of the sleeve 25.

Near the rear end of the tube 23, the worm shaft has a collar 31, Fig. 4, beyond which is a bushing 32. Surrounding this bushing is a series of steel rollers 33, which bear against the inside of the end of the tube 23, and form a roller bearing for the shaft at this point. The extremity of the shaft is similarly mounted in rollers 34 carried in a screw cap 35, which is screwed into the end of the casing 21, and is prevented from unscrewing by a lock-plate 36 fastened to the casing by the screws 37 and engaging a slot in one side of said cap. At each end of the worm is a thrust bearing, preferably composed of radial rollers 38, Figs. 4 and 10 held between annular plates 39 concentric with the shaft 9 and bearing against the ends of the worm and shoulders formed in the casing and the cap.

The worm wheel is keyed rigidly on the tubular axle 40. It has a projecting hub 20', Figs. 3 and 8, on each side which serves to support roller bearings 41 lying between said hub and the stationary hub portions 42 of the casing 21. Secured by screws 43 to the ends of said portions 42 are the annular plates 43' between which are held the fibrous packings 44 which bear on the hub of the worm wheel and exclude dust. On each side of the worm wheel, between it and the walls of the casing 21, are fiber thrust washers 45.

The tubular axle is rotatably supported on a floating axle 46 and is provided with two collars 47 48 between which is fitted the box bearing 49. A leaf spring 50 is secured to this box by the clips 51 and its ends are flexibly fastened to the frame of the car. The shanks of the clips pass through lugs 52 on both halves of the box bearing, and thus serve to hold said halves together.

On the collar 48 are pins 53, Figs. 3 and 9, which engage with a flange 54 on the hub 55 of the driving wheel 2. Said wheel has a sleeve or box 56 of case hardened steel whose outer end is engaged by a washer 57 and a nut 58 on the reduced end portion of the floating axle 46. An ornamental protecting cap 59 is screwed into the end of the hub over the nut and washer. It will be seen that the tubular axle is held against endwise movement by the washer 57 and the collar 60 on the floating axle against which the hub of the worm wheel abuts. The inner end 40' of the tubular axle 40 is tapered so as to have a wedging fit with the worm wheel.

The flange 54 has a cylindrical rim 61 Figs. 5 and 9, to serve as a brake drum. The brake shoes 62 are pivotally supported on an arm 63 which depends from the lower half of the box bearing 49. Springs 64 hold the shoes normally out of engagement with the interior bearing surface of the drum. A bent lever 65 is pivoted to one of said shoes and one arm thereof is connected by a link with the other shoe. A turnbuckle 66 enables the length of said link to be altered at will. The lever and the link form a toggle which can be straightened by means of a rod 67 which is carried forward to any convenient actuating device accessible to the motorist. When the toggle is straightened the brake shoes are thrown out against the inner surface of the brake drum, thereby producing the desired retardation of the speed of the motor car.

By removing the ornamental cap from the hub of the wheel and taking off the nut and washer, the wheel can be slid off the end of the floating axle without disturbing the rest of the mechanism; the flange being easily withdrawn from the pins, and the brake shoes having no connection with the surrounding rim of the drum. Or going a step further and disconnecting the clamping rings 14 of one of the universal joints, and removing the spring clips 51 of the adjacent spring, the worm shaft, worm gearing and casing, tubular driving axle 40 and adjacent parts can be detached from the vehicle as a self-contained unit. This is an important feature, as the parts can be conveniently assembled on the shop-bench and when assembled be applied as a unitary structure to the vehicle. It also facilitates repair.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is:

1. In a motor car, the combination with a floating axle, of a tubular axle thereon having pins at one end, and a driving wheel on said floating axle having a brake flange engaging with said pins.

2. In a motor car, the combination with a floating axle, of a tubular axle thereon, a bearing for said tubular axle, brake mechanism supported on said bearing, and a wheel on the end of said floating axle having a brake drum.

3. In a motor car, the combination with a floating axle, of a tubular axle thereon, a bearing for said tubular axle, brake mechanism supported on said bearing, and a wheel on the end of said floating axle having a brake drum and removably engaged with said driving axle.

4. In a motor car, the combination with a floating axle, of a tubular driving axle thereon having collars, a bearing fitting between said collars, brake shoes pivoted on said bearing, a wheel on the end of said floating axle having its hub provided with a flange engaging with said driving axle, and a rim on said flange coöperating with said brake shoes.

5. In a motor car, the combination with a floating axle, of a tubular driving axle thereon, a box bearing for said driving axle having a depending arm, brake shoes pivoted on said arm, a toggle connecting the upper ends of said shoes, a wheel having a hub provided with a flange removably engaging with said driving axle, and a rim on said flange surrounding said shoes.

In witness whereof, we have hereunto set our hands this fourth day of August, 1905.

HERMANN LEMP.
HENRY S. BALDWIN.

Witnesses:
 JOHN A. MCMANUS, Jr.,
 HARRY E. HEATH.